United States Patent
Sobel

(10) Patent No.: US 7,594,268 B1
(45) Date of Patent: Sep. 22, 2009

(54) PREVENTING NETWORK DISCOVERY OF A SYSTEM SERVICES CONFIGURATION

(75) Inventor: William E. Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 622 days.

(21) Appl. No.: 10/666,843

(22) Filed: Sep. 19, 2003

(51) Int. Cl.
G06F 21/00 (2006.01)

(52) U.S. Cl. ............................ 726/23; 726/27; 709/224

(58) Field of Classification Search ................. 709/224; 726/3, 11, 22–24, 26–27
See application file for complete search history.

(56) References Cited

U.S. PATENT DOCUMENTS

| | | | | |
|---|---|---|---|---|
| 5,414,833 | A | * | 5/1995 | Hershey et al. ............... 726/22 |
| 5,901,284 | A | * | 5/1999 | Hamdy-Swink ............... 726/5 |
| 6,112,246 | A | * | 8/2000 | Horbal et al. ............... 709/230 |
| 6,202,156 | B1 | * | 3/2001 | Kalajan ........................ 726/11 |
| 6,831,890 | B1 | * | 12/2004 | Davis et al. .................. 709/223 |
| 7,024,478 | B1 | | 4/2006 | Dalgic et al. |
| 2003/0101353 | A1 | | 5/2003 | Tarquini et al. |
| 2005/0163131 | A1 | | 7/2005 | Tonnby et al. |

OTHER PUBLICATIONS

Martin Krzywinski, "Port Knocking; Summary of Port Knocking": http://www.portknocking.org/.
Martin Krzywinski, "Port Knocking; Features of Port Knocking": http://www.portknocking.org/view/about/features.
Martin Krzywinski, "Port Knocking; What is Port Forwarding": http://www.portknocking.org/view/about/port_forwarding.
Martin Krzywinski, "Port Knocking; What is Port Triggering": http://www.portknocking.org/view/about/port_triggering.
Martin Krzywinski, "Port Knocking; Port Knocking Requirements": http://www.portknocking.org/view/about/requirements.
Martin Krzywinski, "Port Knocking; Download; Perl": http://www.portknocking.org/view/download/perl.
Martin Krzywinski, "Port Knocking; Port Knocking Lab; Lab Instructions": http://www.portknocking.org/view/knocklab.
Martin Krzywinski, "Port Knocking; Documentation; knockclient": http://www.portknocking.org/view/documentation.

(Continued)

*Primary Examiner*—Gilberto Barron, Jr.
*Assistant Examiner*—Hadi Armouche
(74) *Attorney, Agent, or Firm*—Hunton & Williams LLP

(57) ABSTRACT

Techniques are provided for preventing network discovery of a system services configuration. Preventing network discovery of a host system services configuration includes receiving a request from a remote address at a port on the host, observing a pattern associated with the request, authenticating the remote address based on the pattern associated with the request, and enabling access to the host over the port if the remote address is authenticated. Also provided are the interception of port connection requests and probes to enable connections with an authenticated remote address while preventing remote port scanning and unauthenticated access to a target host. Hiding applications and ports from remote port scanning but creating availability for remote administration is also disclosed. Finally, using connection request and probe patterns to establish a password and enable a remote address to access a port without being observed is provided.

19 Claims, 8 Drawing Sheets

OTHER PUBLICATIONS

Martin Krzywinski, "Port Knocking; Documentation; knockdaemon": http://www.portknocking.org/view/documentation/knockdaemon.
Martin Krzywinski, "Port Knocking; Documentation; readme": http://www.portknocking.org/view/documentation/readme.
Martin Krzywinski, "Port Knocking; FAQ; general": http://www.portknocking.org/view/faq.
Martin Krzywinski, "Port Knocking; FAQ; applications": http://www.portknocking.org/view/faq/applications.
Martin Krzywinski, "Port Knocking; FAQ; mechanism": http://www.portknocking.org/view/faq/mechanism.
Martin Krzywinski, "Port Knocking; FAQ; implementaions": http://www.portknocking.org/view/faq/implementations.
Martin Krzywinski, "Port Knocking; Details; Overview of Port Knocking": http://www.portknocking.org/view/details.
Martin Krzywinski, "Port Knocking; Details; Applications of Port Knocking" http://www.portknocking.org/view/details/application.
Martin Krzywinski, "Port Knocking; Details; Spoofing Eavesdroppers": http://www.portknocking.org/view/details/spoofing.
Martin Krzywinski, "Port Knocking; Details; Data Transfer Across Closed Ports": http://www.portknocking.org/view/details/transfer.
Martin Krzywinski, "Port Knocking; Details; Download Perl Prototype": http://www.portknocking.org/view/details/download.
Martin Krzywinski, "Port Knocking; About; Obscurity": http://www.portknocking.org/view/about/obscurity.
Martin Krzywinski, "Port Knocking; KNOCKLAB; knock_lab": http://www.portknocking.org/view/knocklab/knock_lab.
Martin Krzywinski, "Port Knocking; FAQ; Security": http://www.portknocking.org/view/faq/security.
Martin Krzywinski, "Port Knocking; FAQ; Comments": http://www.portknocking.org/view/faq/comments.
Jeff Hayes, Smart Card, Biometrics and Tokens for VLANS and Subnet Access, Dec. 2001, Alcatel e-Business Networking Division, pp. 1-9.

* cited by examiner

PREVENTING NETWORK DISCOVERY OF A SYSTEM SERVICES CONFIGURATION

FIELD OF THE INVENTION

The present invention relates generally to remote authentication and network security administration. More specifically, techniques for remote authentication while preventing network discovery of system services configuration are disclosed.

BACKGROUND OF THE INVENTION

Remote access and administration of computers is an important activity in networking technologies. The ability to administer and manage computing resources from a remote location has enabled productivity gains and operational cost decreases. However, authentication is a necessary process where remote addresses and systems are used. There are vulnerabilities in networked computing that can be exploited by remotely probing or scanning communications ports on a host, client, server, or computer. If exploited, these vulnerabilities can enable an unauthenticated remote address to gather and exploit information about a particular system and/or services configuration.

Remote port scanning of a target networked computer or host can enable an outside entity to gain information that can be used to launch a directed attack or hack against the host. A remote address can access sensitive data or insert malicious or destructive code segments such as a virus or worm in order to manipulate, corrupt, or destroy information on a host. Additional data relating to the type of operating system or environment and the status of the port can also be obtained. However, unless the remote address is authenticated, access will typically not be granted. Various conventional authentication techniques are used to prevent access by a remote address but still provide vulnerability information that can be used in an attack on a host. Data traffic to a particular port on a host can be observed, "sniffed," or replayed in order to gain access to a host. Conventional authentication techniques, such as behavioral combinations, passwords, shared secrets, or pre-defined authorized IP addresses do not prevent the revelation of information to determine a host system services configuration. In order to prevent this type of exploitation, a network administrator must implement burdensome and expensive countermeasures.

Typical countermeasures include firewalls, virus detection software, and conventional authentication techniques. However, these countermeasures are often costly and place significant resource burdens on hosts (e.g., server and personal firewall, proxy servers, blocking and other security software).

Thus, there is a need for securely and remotely accessing a host while preventing network discovery of system services configured on the host. There is also a need for a solution to prevent unauthenticated remote addresses from gaining access to a host by observing an authenticated connection.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1A:
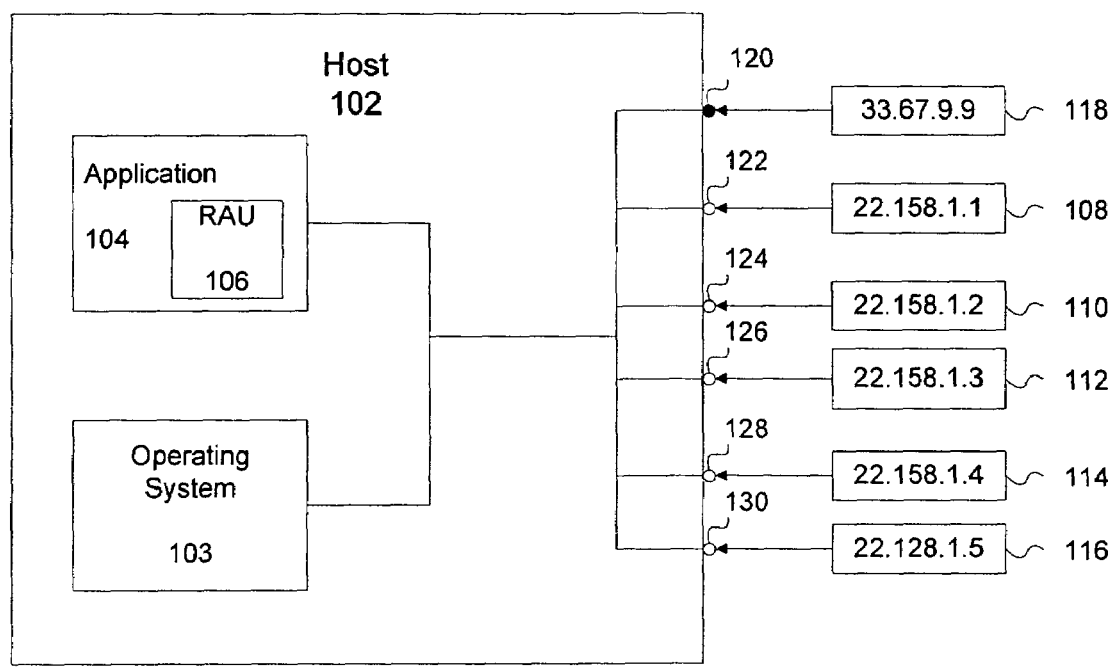
FIG. 1A illustrates a system for preventing network discovery of a system services configuration according to an embodiment of the present invention.

FIG. 1A illustrates a system for preventing network discovery of a system services configuration according to an embodiment of the present invention. In this example, a host 102 includes an operating system 103, an application 104, and a remote authentication utility (RAU) 106. Host 102 communicates with remote addresses (as shown) 108, 110, 112, 114, 116, and 118 via ports 120, 122, 124, 126, 128, and 130. Port 120 is shown as a closed port and no data traffic passes between remote address 33.67.9.9 (118) and host 102. However, ports 122, 124, 126, 128, and 130 are open and connection requests and probes may be sent from remote addresses 108, 110, 112, 114, 116, and 118.

RAU 106 intercepts connection requests and probes from remote addresses 108, 110, 112, 114, 116, and 118 to TCP ports 120, 122, 124, 126, 128, and 130. RAU 106 can also be configured to intercept connection requests and probes to a pre-defined port or range of ports. Connection requests and probes can act as triggers for RAU 106, which, when received, invoke the techniques described below. Data traffic, connection requests, and probes can be composed of individual data packets. Individual (i.e., probe) or multiple data packets (i.e., bulk traffic) can be sent to host 102. A connection request can be directed by a remote address to host 102. Alternatively, a remote scanning IP address may send a number of data packets as probes to multiple hosts. To avoid exploitation of a responding host, RAU 106 tracks connection requests and probes by their source (SRC) IP addresses, which reveal the remote address. The remote address can be used, for example, to block a specific IP address from establishing a connection over a port with host 102. In other examples, a specific IP address may be unknown to the RAU 106, which will not respond to connection requests or probes sent by the unknown IP address. In addition to preventing unknown IP address from accessing host 102, RAU 106 also enables application 104 to externally communicate with properly authenticated remote addresses.

In many cases, applications on host 102 may be communicating or exchanging data with an authenticated remote address. In these cases, RAU 106 would not be required to monitor the port, unless configured to do so. Once a connection is established between host 102 and an authenticated remote address, in some embodiments, RAU 106 does not provide further protection until the connection has been terminated and the port is open again. As an example, protection can include techniques for preventing an unauthenticated remote address from gaining access to a host over a specific port or set of ports. Protection can include identifying a port or pattern of ports based on specific IP addresses, behavioral characteristics, or other criteria to be protected by, for example, RAU 106. However, to establish a connection, a remote address should be authenticated. Authentication techniques can include the use of other patterns and techniques such as hash values, behavioral combinations (e.g., data packets sent to a port in a pre-defined sequence), pre-defined passwords, shared secrets, and authorized address lists. Other techniques may include passwords that can be converted into a series of operations or other passwords.

If a remote address is authenticated, using any available technique, then the port can be opened and made available for connections with host 102. If an authentication attempt fails, then port 120, for example, is closed to the remote address. However, in some embodiments, if authentication fails, RAU 106 can be configured to respond or not respond to connection requests or probes sent to the port. In the previous example of port 120, RAU 106 does not send a response to the probe initiated by remote address 118. This denies any information to the remote address. Thus, RAU 106 provides no basis for remote address 118 to infer information regarding potential vulnerabilities that may exist on host 102. In the case of port 120, RAU 106 can provide a limited response indicating that port 120 is closed. No additional information is available to remote address 118.

In one embodiment, where no response is sent, port 120 is maintained in a "stealth" mode. RAU 106 not only denies access to remote address 118, but also prevents the operating system 103 from sending any response (e.g., an ICMP message) or information back to remote address 118. RAU 106 prevents remote addresses from gathering information and determining what services, if any, may be running on a range of ports on host 102. Moreover, by preventing a response to a probe from being sent to a remote address, an unauthenticated remote address is denied information that might be used to determine what behavior, if any, can be used to properly authenticate and establish a connection with the host 102.

Figure 1B:
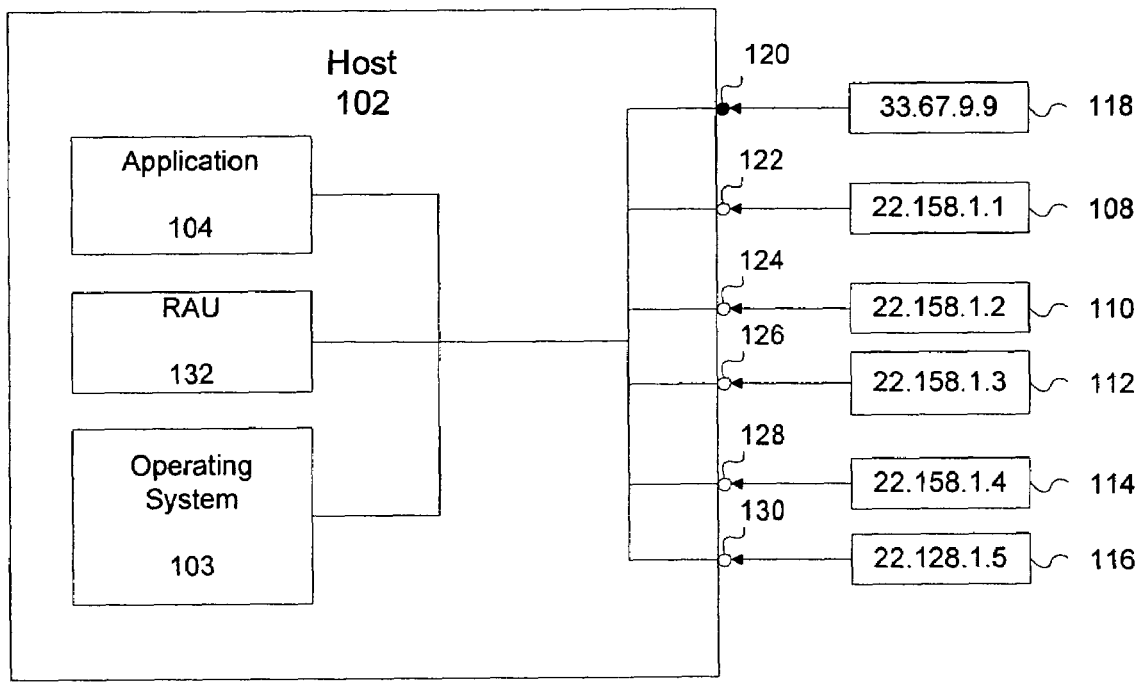
FIG. 1B illustrates a system for preventing network discovery of a system services configuration with a RAU application according to an embodiment of the present invention.

FIG. 1B illustrates a system for preventing network discovery of a system services configuration with a RAU application according to an embodiment of the present invention. In this example, RAU 132 is similar in features and functionality to RAU 106 (FIG. 1A), but implemented as a separate application on host 102. Communicating with operating system 103 and application 104, RAU 132 intercepts connection requests to ports 120, 122, 124, 126, 128, and 130 initiated by remote addresses 108, 110, 112, 114, 116, and 118. RAU 132 intercepts connection requests and probes sent to host 102, forcing authentication of remote addresses 108-118 prior to permitting a connection to be established. Once established, the connection between host 102 and remote addresses 108, 110, 112, 114, 116, and 118 over ports 120, 122, 124, 126, 128, and 130 enables data to be exchanged between host 102, operating system 103, application 104, and any of remote addresses 108, 110, 112, 114, 116, and 118, unless a port is closed, as shown in the case of port 120.

Figure 2:
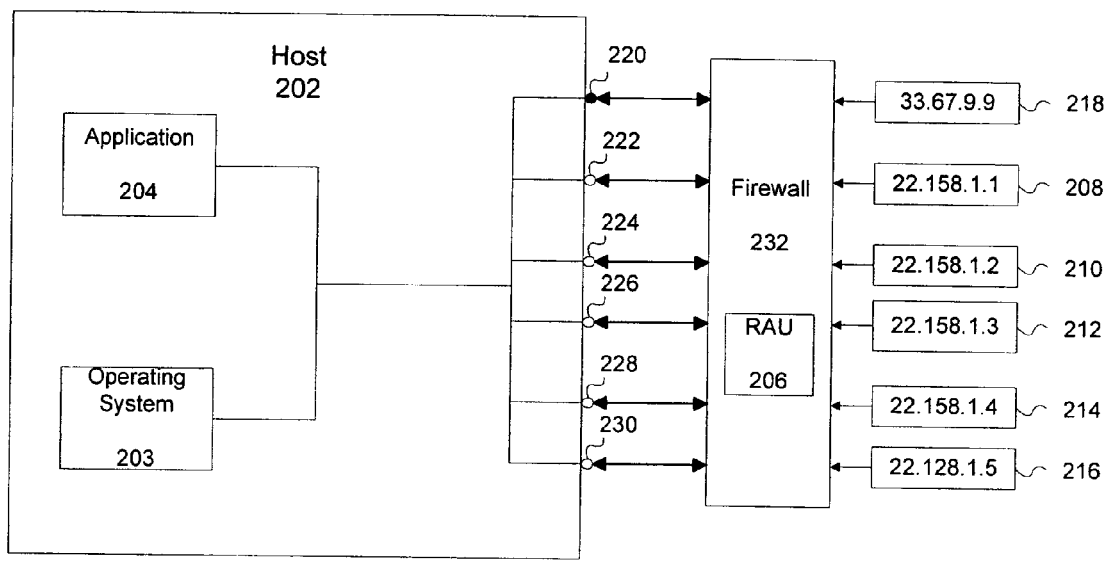
FIG. 2 illustrates a system for preventing network discovery of a system services configuration with a RAU implemented as part of a firewall according to an embodiment of the present invention.

FIG. 2 illustrates a system for preventing network discovery of a system services configuration with a RAU implemented as part of a firewall according to an embodiment of the present invention. In this example, RAU 206 is a software agent performing the functions described above, included within firewall 232. Firewall 232 may be implemented as a host or server-side application. Connection requests and probes sent to host 202 are made by remote addresses 208, 210, 212, 214, 216, and 218. The connection requests and probes can be intercepted by firewall 232 in an attempt to prevent intrusions, viruses, worms, backdoors, and other unauthenticated remote addresses from gaining access to host 202. RAU 206 can hide ports 220, 222, 224, 226, 228, and 230 by intercepting connection requests and probes at firewall 232 and preventing a response from being sent. By suppressing responses to connections requests or probes initiated by unauthenticated remote addresses, ports 220, 222, 224, 226, 228, and 230 can be hidden from external view. Authenticated remote users may access ports 220, 222, 224, 226, 228, and 230 if permitted by RAU 206. Access to a host via its communication ports is protected by RAU 206, as described below.

The features and functionality provided by RAU 106, 206 can be performed by other utilities, clients, or applications intended to provide security for a host 102, 202. In the embodiments above, RAU 106, 206 protected a host 102, 202 by hiding the system services configuration from unauthenticated remote addresses scanning, probing, or sending connection requests. In other embodiments, RAU 106, 206 can be implemented by using individual or multiple applications that also provide protective measures intended to prevent network discovery of system services configuration by denying responses to be sent to remote addresses. Network security features such as those embodied in RAU 106, 206 are not limited to the embodiments discussed above.

Figure 3:
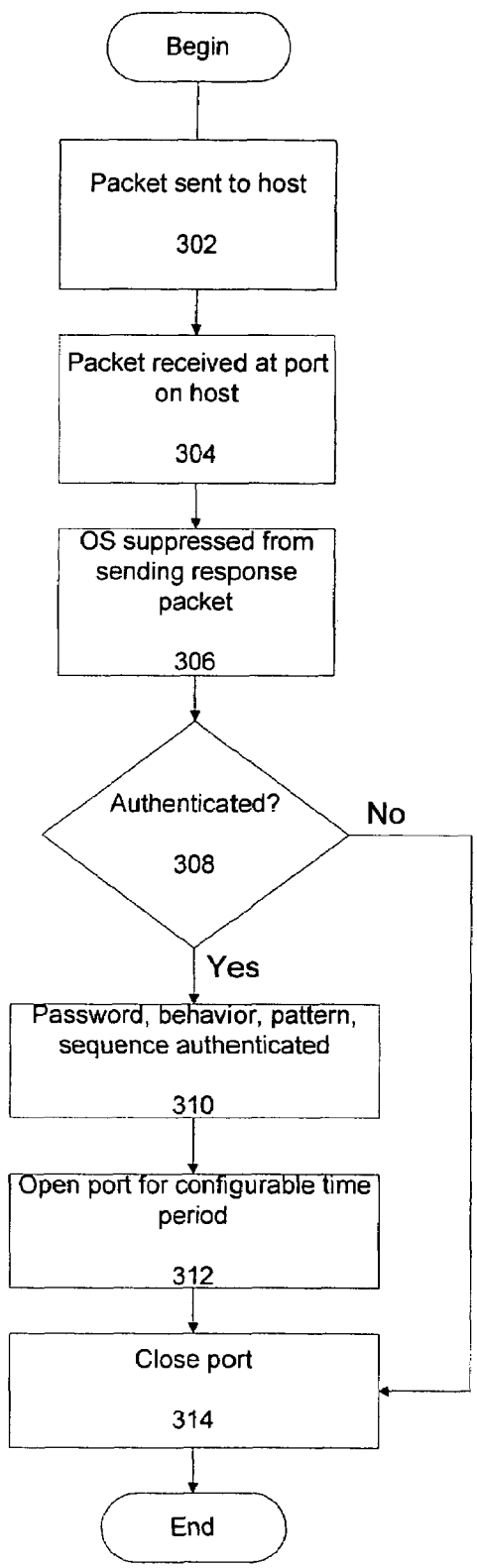
FIG. 3 illustrates a process for preventing network discovery of a system services configuration according to an embodiment of the present invention.

FIG. 3 illustrates a process for preventing network discovery of a system services configuration according to an embodiment of the present invention. In this example, a specific port to be opened is identified (302). The identified port is then opened (304). Based on data traffic received at the open port, RAU 106 can intercept connection requests, probes, and other data packets sent by remote addresses (i.e., remote addresses 108, 110, 112, 114, 116, and 118) at the open port (306). As discussed herein, connection requests, probes, and scans are composed of one or more data packets. In general, any data traffic sent to a port can be composed of one or more data packets. Connection requests and probes may be handled by RAU 106 and can require authentication of the remote address requesting a connection. Upon receipt RAU 106 attempts to authenticate the packet(s) (308). If the packet is authenticated, in this example, then a port with a network service operating on it is opened for a configurable time period (310). The configurable time period is a window during which an authenticated remote client (for example, clients 118, 116) may establish a connection with the host 102 (312). Once a connection is established the port can be closed to prevent any further remote use or exploitation. Also in this example, if a packet or other incoming data traffic fails to properly authenticate, then the port may also be closed or kept closed in order to prevent remote access or exploitation (314).

Figure 4A:
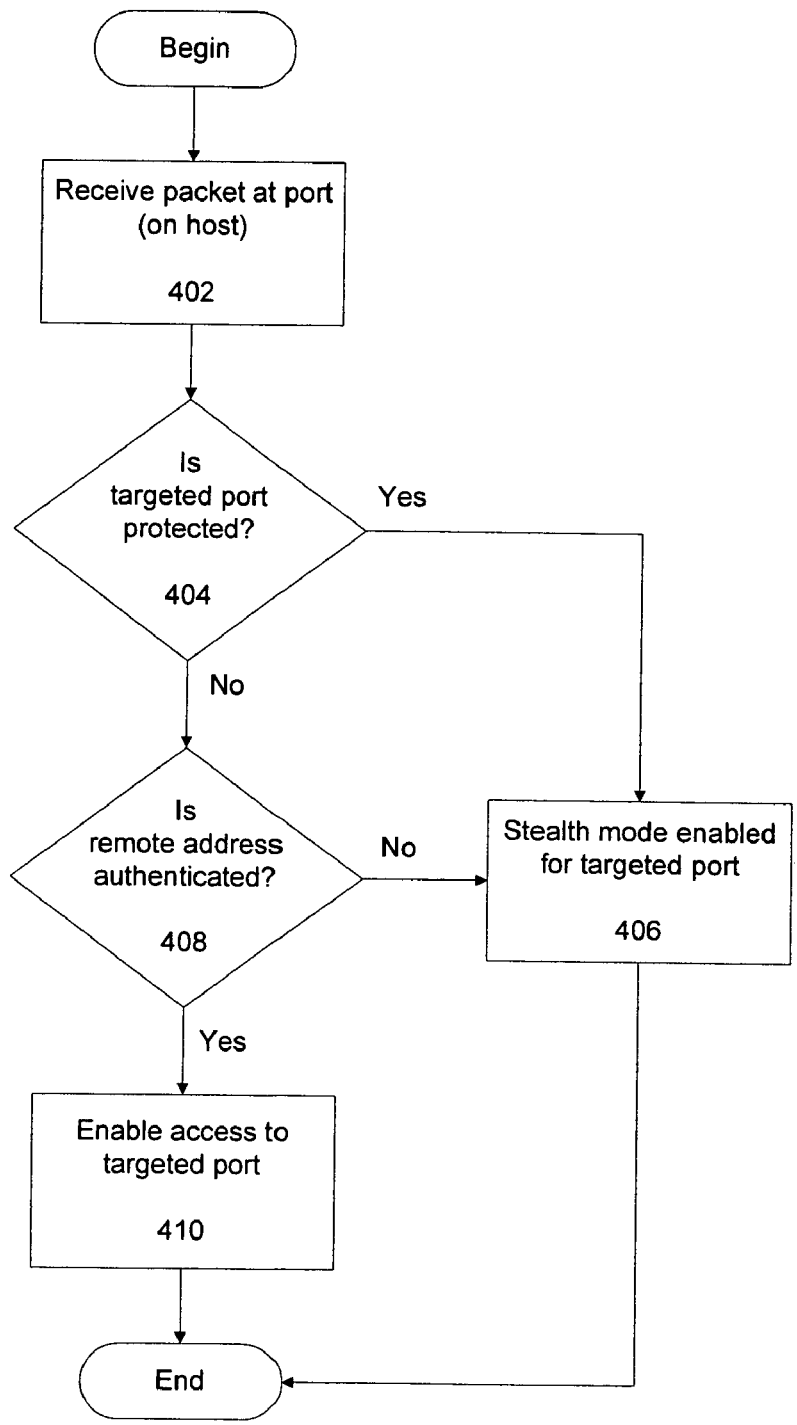
FIG. 4A illustrates a process for protecting a host against remote port scanning and discovery of a system services configuration according to an embodiment of the present invention.

FIG. 4A illustrates a process for protecting a host against remote port scanning and discovery of a system services configuration according to an embodiment of the present invention. RAU 106 is passively monitoring or "listening" to ports 120, 122, 124, 126, 128, and 130 to determine if a connection request or probe is received (402). If, for example, port 120, is not protected by RAU 106, then port 120 is placed into a stealth mode to prevent any response being sent back to the remote address (404). If RAU 106 determines that an access attempt in the form of a connection request or probe was sent to port 120, then it also determines if port 120 is designated as a RAU-protected port (406). If a port is protected or not published as a known port for external access, then RAU 106 determines if the requesting remote address 118 is allowed access (authenticated) (408). If the remote address is authenticated, then the targeted port may be opened to enable access and a connection to be established. Published ports, in this context, refers to ports that are known to a host and associated with a particular set of characteristics (i.e., authorized for access). Published ports can be made available to a remote address for connecting to a network service on the system 100, provided proper authentication occurs.

In some embodiments ports may be made available for external access and thus are not protected by RAU 106. A set of known ports can be published publicly to enable application 104 on host 102 to call APIs and retrieve data for various processes. A list of all ports is kept by RAU 106 and connection requests and probes to ports not listed are intercepted. However, if port 120 were intended to be a dedicated access port for remote administration, then RAU 106 protects the port as described above. User-specified rules may also define protected and non-protected ports.

If a remote address is authenticated, then RAU 106 directs operating system 103 to open port 120 and allow remote address 118 to initiate and establish a connection for a configurable amount of time. RAU 106 enables access to the remote address 118, which includes permitting the remote address 118 to initiate and establish a connection. A configurable amount of time permits an additional layer of security in that properly authenticated remote addresses can only attempt to establish a connection during a finite period of time. Once connected, the proper source IP address host can keep the connection open. If a connection has not been established by the expiration of the time period, the remote address, even if previously authenticated, will be denied from accessing port 120. In general, RAU 106 observes and records connection requests or probes, but prevents operating system 103 or application 104 from sending a response or response packet back to the remote address. However, a remote administrator may be able to access port 120 if a password or proper sequence of packets were sent to port 120.

By sending a specific sequence of packets to the port, RAU 106 observes the behavior of the packets and authenticates the remote administrator, if the behavior matches a pre-defined sequence. If the remote administrator sends the proper sequence of packets, thus employing a "behavioral" password, then RAU 106 directs operating system 103 to open port 120 for a configurable period of time in which the remote administrator may initiate and establish a connection. RAU 106 does not respond to the behavioral password of packets sent by the remote administrator. This prevents a remote scanning IP address from observing the initiating and responding hosts' behavior, which can be replayed to attempt access. Also, if a random connection request or probe is sent to the same port during the proper sequence of access attempts by an authenticated IP address, interference would not occur.

If the authenticated remote administrator fails to initiate and establish a connection with the port during the configurable period of time, RAU 106 directs operating system 103 to close port 120 again. To further prevent unauthenticated access to port 120, a list of passwords may be rotated or changed, which is also configurable by RAU 106. A number of other authentication techniques including handshaking, pre-defined shared secrets, passwords, and other techniques can be used. Other conventional authentication techniques may be used as well.

RAU 106 prevents unauthenticated remote addresses from scanning ports 120, 122, 124, 126, 128, and 130, for example, and exploiting vulnerabilities based on information or data gathered in response to a failed connection request or probe. RAU 106 can also prevent unauthenticated access by passively monitoring incoming data traffic. Upon properly authenticating a remote address, RAU 106 may direct operating system 103 to open a port for a configurable period of time in which to establish an authenticated connection.

Figure 4B:
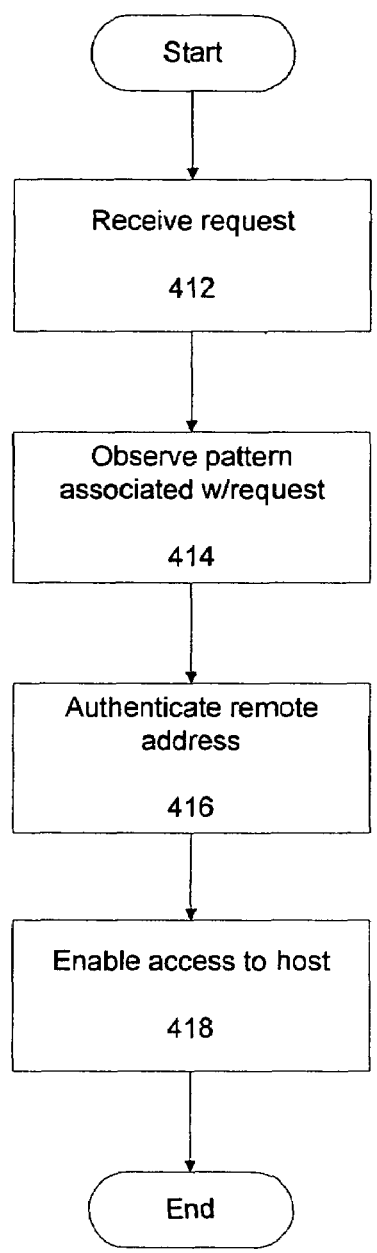
FIG. 4B illustrates a method of network security, in accordance with an alternative embodiment of the present invention.

FIG. 4B illustrates a method of network security, in accordance with an alternative embodiment of the present invention. Referring to the system example in FIG. 1, a connection request may be received by host 102 and RAU 106 (412). If received, the request can be evaluated to determine whether a specific pattern is present (414). The specific pattern may conform to a properly authenticated pattern of, for example, connection requests, probes, or scans. Upon receipt of these patterns, RAU 106 may be able to authenticate the remote address (416). Once authenticated, RAU 106 may direct operating system 103 to permit access to host 102, for example, over a targeted port with a network service (418). In other embodiments, patterns may be substituted for passwords, encryption keys, or other conventional authentication mechanisms. However, the examples described above provide passive capabilities for authenticating and enabling access to a host without providing indications to an attacker of services that may be running on a host.

Figure 5:
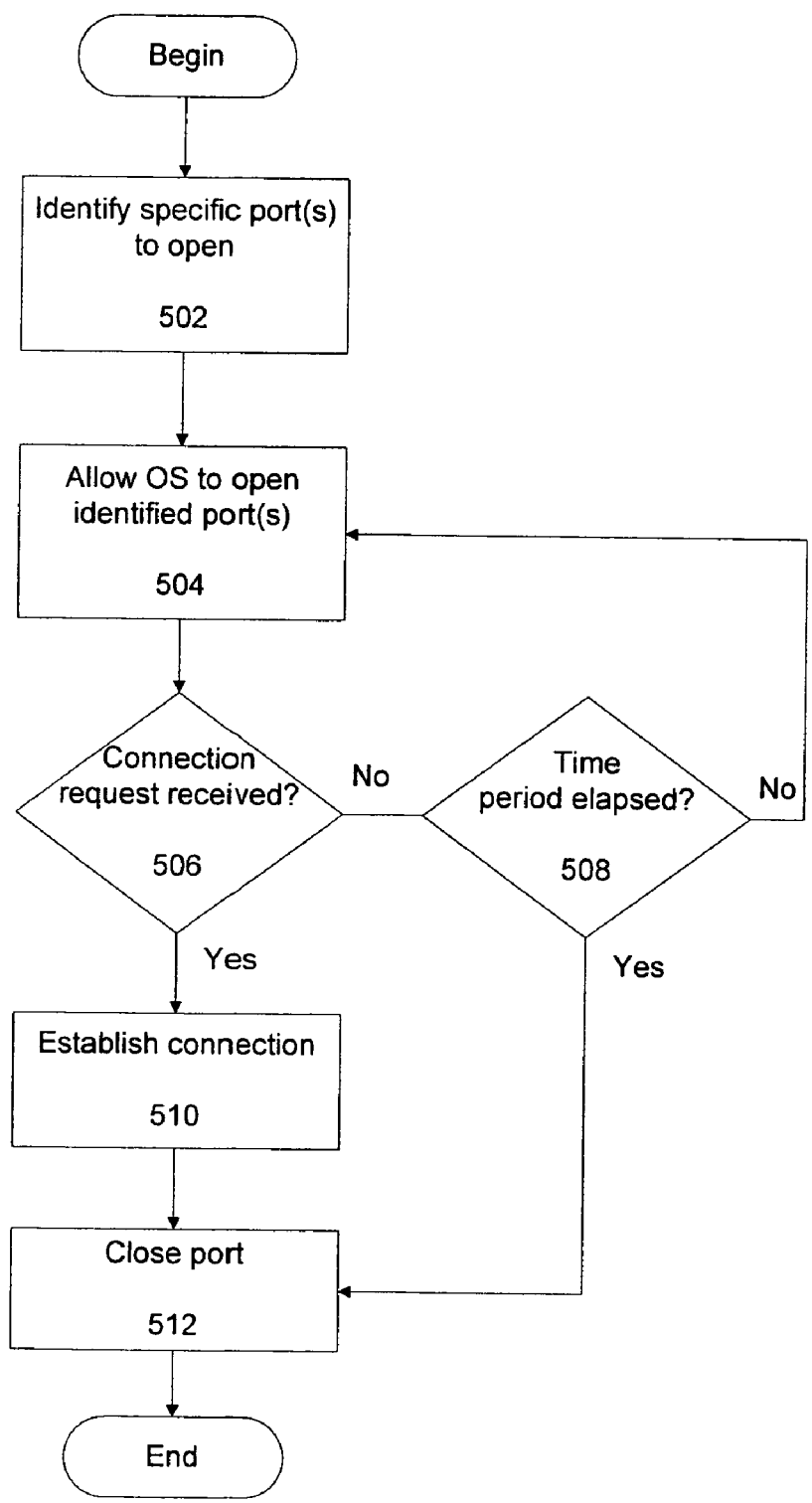
FIG. 5 illustrates a method for enabling access to a port in accordance with an embodiment of the present invention.

FIG. 5 illustrates a method for enabling access to a port in accordance with an embodiment of the present invention. RAU 106 identifies a port or range of ports to open, based on the behavior of data traffic from a properly authenticated remote address (502). RAU 106 may direct operating system 103 to open the identified ports (504). Once the port has been opened for access, RAU 106 passively monitors the port or range of ports for a connection request from the properly authenticated remote address (506). If a connection request is not received, then RAU 106 can keep the port open, for a configurable amount of time (508). If a connection request is received, then RAU 106 can permit a connection to be established over the identified port(s) (510). Once established, the port is closed and no longer active, thus preventing other remote addresses from gaining access to host 102 (512).

Figure 6:
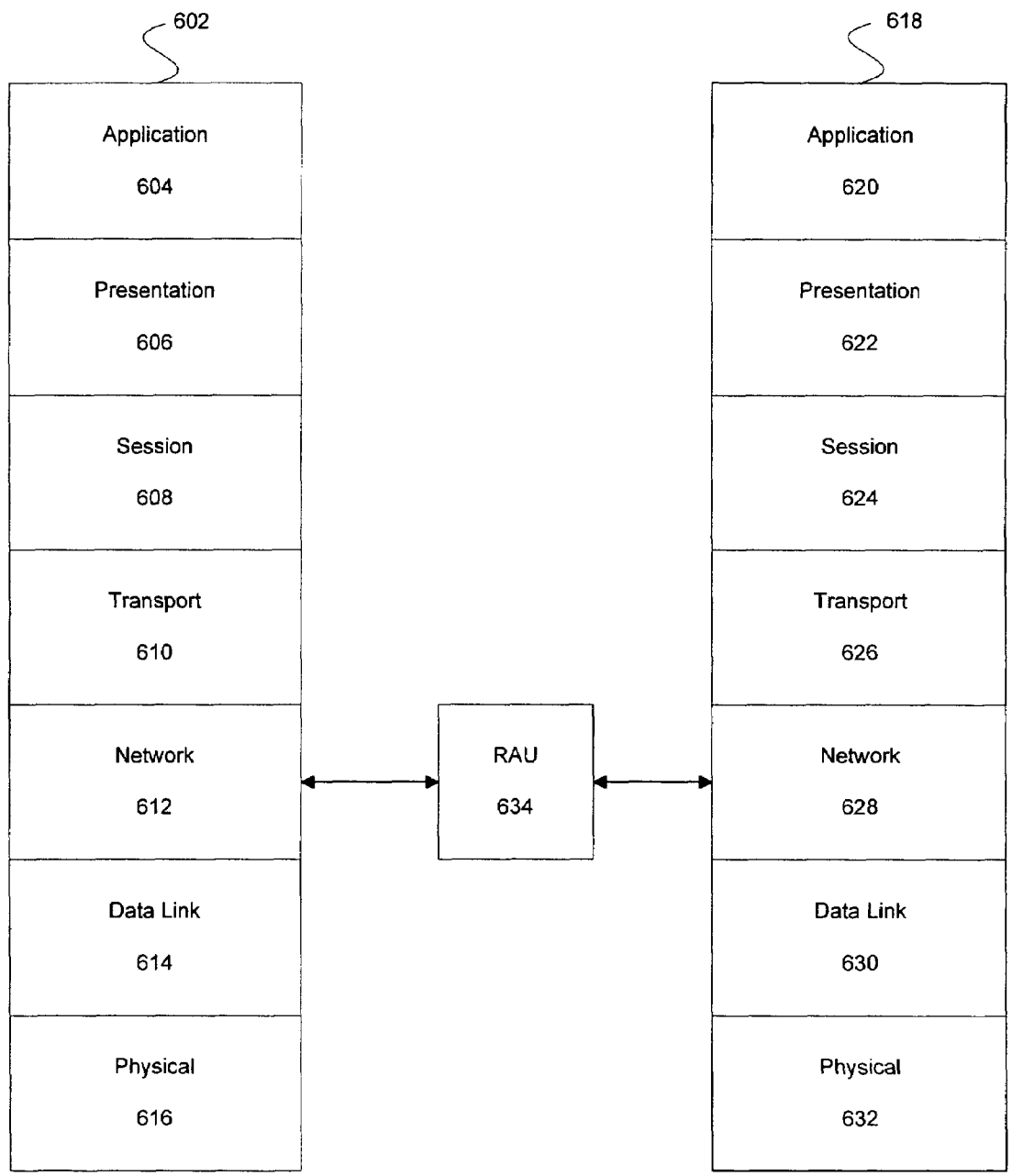
FIG. 6 illustrates an architectural schema of an exemplary remote authentication utility (RAU) 634 that prevents network discovery of a system services configuration according to an embodiment of the present invention.

FIG. 6 illustrates an architectural schema of an exemplary remote authentication utility (RAU) 634 that prevents network discovery of a system services configuration according to an embodiment of the present invention. In this example, hosts 602 and 618 are illustrated in terms of protocol stacks in accordance with system architectural schemas such as the Open Systems Interconnection (OSI) model. Several layers are shown for each of hosts 602 and 618. Application 604, 620, Presentation 606, 622, Session 608, 624, Transport 610, 626, Network 612, 628, Data Link 614, 630, and Physical 616, 632 layers are shown. RAU 634, which is similar to RAU 106, 132, and 206 functions at the network layer or "stack" level of the architectural schema. At the network stack, RAU 634 is a component ensuring authenticated flow of data traffic between hosts 602 and 618. RAU 634 can provide routing and authentication features such as those described above which permits an authenticated connection to be initiated and established between hosts 602 and 618. By interfacing with the network stack, RAU 634 intercepts the individual data packets that comprise connection requests, probes, or any other data traffic sent to a host it protects. However, RAU 634 can also integrate at other layers, multiple layers, or in other architectural schemas (e.g., SNA, DNA, etc.).

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for network security comprising:
   receiving a request from a remote address at a host;
   observing a behavioral pattern of packets associated with the request;
   authenticating the remote address based on the behavioral pattern of packets associated with the request; and
   enabling access to the host by the remote address for a configurable time period if the remote address is authenticated;
   wherein the authentication is based at least in part on a determination that the observed behavioral pattern of packets matches a properly authenticated pattern comprising a plurality of connection requests, probes, or scans received in a specific sequence corresponding to the pattern; and wherein enabling access comprises allowing the remote address to establish, through a connection request received during the configurable period of time, a connection with the host via a port with which the request is associated and closing the port after expiration of the configurable period of time; wherein closing the port after the expiration of the configurable period of time results in connection requests received after the port has been closed being rejected while allowing the remote address to continue to communicate with the host, even after the port has been closed to new connection requests, through the connection established through the connection request received during the configurable period of time.

2. A method for preventing network discovery of a system services configuration as recited in claim 1 further including preventing a response from being sent to the remote address.

3. A method for preventing network discovery of a system services configuration as recited in claim 1 wherein receiving a request from a remote address at the host further includes receiving a probe.

4. A method for preventing network discovery of a system services configuration as recited in claim 1 wherein observing a pattern associated with the request further includes recording data received at the host.

5. A method for preventing network discovery of a system services configuration as recited in claim 1 wherein observing a pattern associated with the request further includes matching the pattern to a list.

6. A method for preventing network discovery of a system services configuration as recited in claim 1 wherein observing a pattern associated with the request further includes recording a sequence.

7. A method for preventing network discovery of a system services configuration as recited in claim 1 wherein authenticating the remote address based on the pattern associated with the request further includes comparing the pattern to a list.

8. A method for preventing network discovery of a system services configuration as recited in claim 1 wherein authenticating the remote address based on the pattern associated with the request further includes preventing a response being sent to the remote address if the remote address fails to authenticate.

9. A method for preventing network discovery of a system services configuration as recited in claim 1 wherein authenticating the remote address based on the pattern associated with the request further includes denying access to the host if the remote address fails to authenticate.

10. A method for preventing network discovery of a system services configuration as recited in claim 1 wherein authenticating the remote address based on the pattern associated with the request further includes sending a message to the remote address if the request fails to authenticate.

11. A method for preventing network discovery of a system services configuration as recited in claim 1 wherein enabling access to the host by the remote address further includes implementing a handshake between the remote address and the host.

12. A system for preventing network discovery of a system services configuration comprising:
    a port for receiving a request from a remote address;
    a listening module for observing a behavioral pattern of packets associated with the request; and
    an agent for authenticating the remote address and the behavioral pattern of packets associated with the request and enabling access to the port if the behavioral pattern of packets associated with the request is authenticated;
    wherein the authentication is based at least in part on a determination that the observed behavioral pattern of packets matches a properly authenticated pattern comprising a plurality of connection requests, probes, or scans received in a specific sequence corresponding to the pattern; and wherein enabling access comprises allowing the remote address to establish, through a connection request received during the configurable period of time, a connection with the host via a port with which the request is associated and closing the port after expiration of the configurable period of time; wherein closing the port after the expiration of the configurable period of time results in connection requests received after the port has been closed being rejected while allowing the remote address to continue to communicate with the host, even after the port has been closed to new connection requests, through the connection established through the connection request received during the configurable period of time.

13. A computer program product for preventing network discovery of a system services configuration, the computer program product being embodied in a computer readable medium and comprising computer instructions for:

receiving a request from a remote address at a port;

observing a behavioral pattern of packets associated with the request;

authenticating the request from the remote address based on the behavioral pattern of packets associated with the request; and enabling access by the remote address to the port to initiate a connection if the request is authenticated;

wherein the authentication is based at least in part on a determination that the observed behavioral pattern of packets matches a properly authenticated pattern comprising a plurality of connection requests, probes, or scans received in a specific sequence corresponding to the pattern; and wherein enabling access comprises allowing the remote address to establish, through a connection request received during the configurable period of time, a connection with the host via a port with which the request is associated and closing the port after expiration of the configurable period of time; wherein closing the port after the expiration of the configurable period of time results in connection requests received after the port has been closed being rejected while allowing the remote address to continue to communicate with the host, even after the port has been closed to new connection requests, through the connection established through the connection request received during the configurable period of time.

14. The system of claim 12 wherein the agent is configured to prevent a response from being sent to the remote address.

15. The system of claim 12 wherein receiving a request from a remote address at the host further includes receiving a probe.

16. The system of claim 12 further including a recording module for recording the received pattern.

17. The system of claim 12 further including a matching module for matching the observed pattern to a list.

18. The system of claim 12 wherein authenticating the remote address based on the pattern associated with the request further includes comparing the pattern to a list.

19. The system of claim 12 wherein authenticating the remote address based on the pattern associated with the request further includes preventing a response being sent to the remote address if the remote address fails to authenticate.

* * * * *

UNITED STATES PATENT AND TRADEMARK OFFICE
CERTIFICATE OF CORRECTION

PATENT NO.       : 7,594,268 B1                                   Page 1 of 1
APPLICATION NO. : 10/666843
DATED            : September 22, 2009
INVENTOR(S)      : William E. Sobel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Twenty-eighth Day of September, 2010

David J. Kappos
*Director of the United States Patent and Trademark Office*